United States Patent Office 3,255,218
Patented June 7, 1966

3,255,218
17(20)-ENOL-21-ALDEHYDES OF THE PREGNANE SERIES
Hershel L. Herzog, Mountain View, N.J., assignor to Schering Corporation, Bloomfield, N.J., a corporation of New Jersey
No Drawing. Filed Mar. 28, 1962, Ser. No. 183,033
18 Claims. (Cl. 260—397.45)

This invention relates to compositions of matter classifiable in the field of chemistry as steroidal enol aldehydes. More particularly, this invention relates to novel steroidal 17(20)-enol-21-aldehydes, to the process for their preparation, and to the method of employing these compounds as intermediates in the preparation of valuable therapeutically active gluco- and mineralocorticoids and progestational agents.

The subject matter which applicant regards as his invention is described as residing in the discovery that the 17α,21-dihydroxy-20-keto side chain attached at position 17 in steroids of the pregnane series is readily rearranged by heating the appropriate steroid in solution in a weak acid. The product which results in each case now bears the 17(20)-enol-21-aldehyde side chain and belongs to a heretofore rather inaccessable class of steroid compounds.

These enol aldehydes are reactive compounds which, for example, are reduced readily by the action of zinc and a weak acid to the corresponding 21-hydroxy-20-ketosteroids. This latter functional system is characteristic of the physiologically important group of mineralocorticoids such as, for example, desoxycorticosterone, corticosterone and aldosterone which maintain mineral balance in many mammalian species, including man.

In addition, the enol aldehydes of this invention are readily converted into the corresponding 20-lower alkanoyl enol esters by treatment with a lower alkanoic acid anhydride in pyridine. When subjected to reduction by the action of zinc and a weak acid these esters yield the corresponding 17(20)-enol-20-acylates as distinguished from the 21-hydroxy-20-keto steroids produced by the similar reduction of parent enol aldehyde. The 17(20)-enol-20-acylates so produced can be converted by conventional techniques into the corresponding 21-desoxy-20-ketosteroids, which functional system is characteristic of such physiologically important progestational agents as progesterone and its 11β-hydroxy and 11-keto derivatives.

Neither the process of rearrangement, nor the conversion of the enol aldehyde into the corresponding 20-enol ester, nor the reduction of the enol aldehyde or its 20-enol ester derivative is in any way inhibited by alterations in rings A, B or C of the steroid. For example, Δ¹-unsaturation may be present or absent; there may be a hydroxyl or keto group at position 3; Δ⁴-unsaturation may be present or absent; the 6-position may carry a lower alkyl substituent; the 9-position may be halogenated; the 11-position may be unsubstituted or carry a hydroxyl or keto group; and position 16 may carry a lower alkyl substituent. Typical variations in starting material structure and the products obtained therefrom may be illustrated as follows:

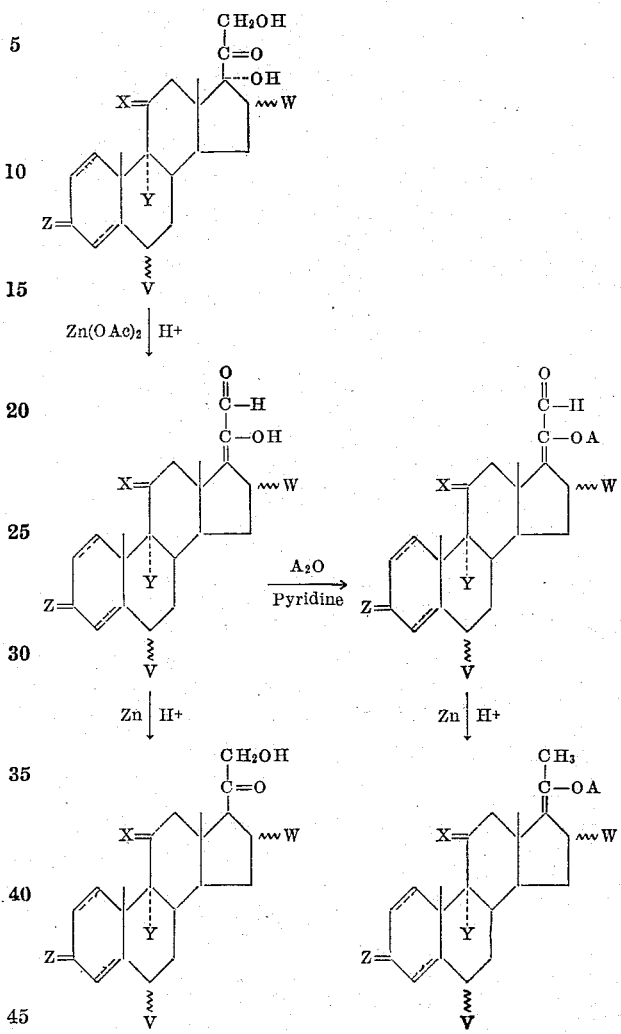

wherein Z may be O, (H, α-OH) or (H, β-OH); V may be H or lower alkyl; Y may be H, chlorine or fluorine; X may be $H_2$, O or (H, β-OH); W may be H or lower alkyl; A is lower alkanoyl; and wherein Z cannot be (H, OH) when both double bonds are in the A-ring.

The rearrangement is usually carried out by refluxing a dilute solution of the steroid in acetic acid for from 1–8 hours, preferably in the presence of zinc acetate dihydrate which acts as a catalyst. The acid may be any lower fatty acid of which the most preferred are those boiling below 150° C. Other zinc salts may be used as catalysts, the hydrated salts of lower fatty acids being preferred. The optimum reaction time will vary with the steroidal substrate and with the lower fatty acid but is usually within the range mentioned above with from 2–4 hours sufficing for most compounds.

The enol aldehyde reaction product is isolated by removing the solvent acid by distillation in vacuo, or by evaporation, followed by chromatography of the acid-free residue over a magnesium silicate such as Florisil. The solvent required to elute the enol aldehyde will vary with the degree of oxygenation of the steroid. Usually methylene chloride or mixtures of alcohols such as methanol or ethanol and the like with methylene chloride will effect the desired separation. The first eluates from the column which crystallize usually contain the enol aldehyde.

The conversion of enol aldehydes into the corresponding 20-lower alkanoic enol esters is conveniently carried out by dissolving the enol aldehyde in pyridine and adding thereto the desired lower alkanoic acid anhydride. Organic bases other than pyridine may be employed. Particularly desirable bases are the tertiary nitrogen bases and sodium acetate. The reaction may also be carried out in the presence of catalytic quantities of p-toluene sulfonic acid. After the addition of the anhydride, the reaction mixture is held at room temperature for a period of from 8 hours to 3 days. The ester is precipitated by addition of water and recovered by filtration. While the optimum reaction time will vary with the nature of the reactants, an overnight period is usually sufficient.

The enol aldehyde products show a characteristic absorption in the ultraviolet in the range of from 260–280 mμ which as a rule is not present in the parent steroid. The corresponding 20-lower alkanoyl enol esters have a characteristic band in the infrared at 5.65–5.70μ and show enhanced ultraviolet absorption in the 240–250 mμ region, with disappearance of the band in the 260–280 mμ region.

Among the enol aldehydes of particular interest which may be prepared according to the process of this invention are 4,17(20)-pregnadiene-20-ol-21-al-3-one,
1,4,17(20)-pregnatriene-20-ol-21-al-3-one,
4,17(20)-pregnadiene-11β,20-diol-21-al-3-one,
1,4,17(20)-pregnatriene-11β,20-diol-21-al-3-one,
4,17(20)-pregnadiene-20-ol-21-al-3,11-dione,
1,4,17(20)-pregnatriene-20-ol-21-al-3,11-dione,
9α-fluoro-4,17(20)-pregnadiene-11β,20-diol-21-al-3-one,
9α-fluoro-1,4,17(20)-pregnatriene-11β,20-diol-21-al-3-one,
9α-chloro-4,17(20)-pregnadiene-20-ol-21-al-3,11-dione,
9α-chloro-1,4,17(20)-pregnatriene-20-ol-21-al-3,11-dione, the 6α-methyl substituted derivatives of the preceding compounds, and the 16α- and 16β-methyl derivatives thereof.

As may be seen from the above description, the disclosed processes are of general application and may be used to convert 17α,21-dihydroxy-20-keto pregnanes broadly into 17(20)-enol-21-aldehydes and to the corresponding 20-enol esters. Among the enol aldehydes and enol esters so produced are many novel compounds, heretofore unknown, which applicant considers to be embraced within the scope of his invention and which are illustrated by the following structural formulae:

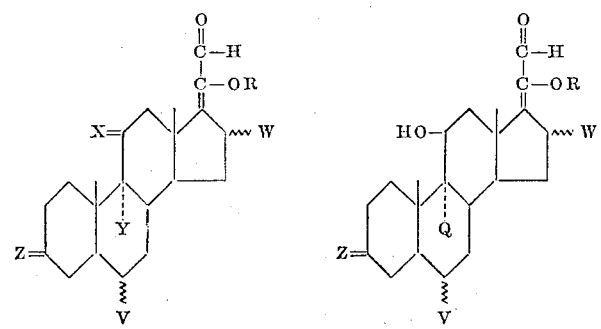

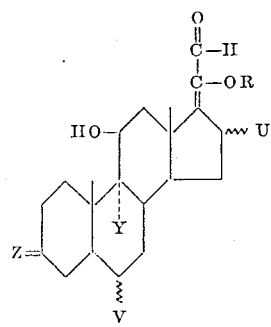

and the Δ⁴- and Δ¹,⁴-dehydro analogs thereof wherein Z may be O, (H, αOH) or (H, βOH); V may be H or lower alkyl; Y may be H, chlorine or fluorine; Q may be chlorine or fluorine; X may be $H_2$ or O; W may be H or lower alkyl; U is lower alkyl; R may be H or lower alkanoyl; and wherein Z is O when both double bonds are present in the A-ring.

Reduction of the above, as well as other 17(20)-enol-21-aldehydes yields potent gluco- and mineralocorticoids. Thus, for example, the compound 4-pregnene-17α,21-diol 3,20-dione may be refluxed with glacial acetic acid in the presence of zinc diacetate dihydrate to give 4,17(20)-pregnadiene-20-ol-21-al-3-one. This enol aldehyde may then be reduced under very mild conditions, such as for example with zinc and acetic acid or with lithium aluminum-trit-t-butoxyhydride in tetrahydrofuran, to yield 4-pregnadiene-21-ol-3,20-dione (desoxycorticosterone), a potent mineralocorticoid.

Reduction of the above, as well as other, 17(20)-enol-21-aldehyde-20-esters by methods previously discussed yields the corresponding 21-desoxy enol esters which may be subsequently converted by conventional techniques into valuable progestational agents. For example, 4,17(20)-pregnadiene-20-ol-21-al-3-one, as prepared in the preceding paragraph, may be treated with acetic anhydride in pyridine to give 4,17(20)-pregnadiene-20-ol-21-al-3-one 20-acetate which, when treated with zinc and acetic acid, is converted into 4,17(20)-pregnadiene-20-ol-3-one 20-acetate. Hydrolysis of this compound, using for example, alcoholic potassium hydroxide, yields 4-pregnene-3,20-dione (progesterone). As can be seen from the above, this series of reactions not only affords a novel synthesis of important progestational agents, but represents a method for simplifying side-chain structure by removal of 17 and 21-hydroxyl groups which may be useful in structure problems arising from the microbiological transformation of steroids.

The best mode contemplated by the inventor for carrying out his invention will now be described as follows:

EXAMPLE 1

*1,4,17(20)-pregnatriene-20-ol-21-al-3-one*

Heat at reflux for six hours a solution of 2.0 gm. of 1,4-pregnadiene-17α,21-diol-3,20-dione in 200 ml. of glacial acetic acid. Cool to room temperature and concentrate by evaporation to a residue. Take up the residue in methylene chloride, wash free of acetic acid with water, dry and concentrate the resulting solution to a small volume. Chromatograph the solution over 50 gm. of Florisil and elute with methylene chloride. Crystallize the eluate and purify by recrystallization from acetone-hexane.

EXAMPLE 2

*1,4,17(20)-pregnatriene-20-ol-21-al-3-one 20-acetate*

Dissolve 0.10 gm. of 1,4,17(20)-pregnatriene-20-ol-21-al-3-one (the compound of Example 1) in 1 ml. of pyridine. Add 1 ml. of acetic anhydride and allow the mixture to stand at room temperature for sixty-four hours. Add excess water and remove the precipitate by filtration. Recrystallize from ether-hexane.

EXAMPLE 3

*4,17(20)-pregnadiene-11β,20-diol-21-al-3-one*

Heat at reflux for two hours a solution of 10.0 gm. of 4-pregnene-11β,17α,21-triol-3,20-dione in 400 ml. of glacial acetic acid, containing 1.0 gm. of zinc acetate dihydrate. Cool the mixture to room temperature and concentrate by evaporation. Extract the residue with methylene chloride and wash the extract free of acetic acid with water. Dry the extract, concentrate and chromatograph over 50 mg. of Florisil. Elute with ether, crystallize the eluate and purify by recrystallization from ether-hexane.

EXAMPLE 4

*4,17(20)-pregnadiene-11β,20-diol-21-al-3-one 20-acetate*

Mix 0.50 gm. of 4,17(20)-pregnadiene-11β,20-diol-21-al-3-one (the compound of Example 3) with 5 ml. of pyridine and 5.0 ml. of acetic anhydride. Store at room temperature overnight. Add ice water and separate the precipitate by filtration. Recrystallize from acetone-hexane.

EXAMPLE 5

*1,4,17(20)-pregnatriene-11β,20-diol-21-al-3-one*

Reflux for two hours a solution of 9.95 gm. of 1,4-pregnadiene-11β,17α,21-triol-3,20-dione in 400 ml. of glacial acetic acid containing 1.0 gm. of zinc acetate dihydrate. Cool the mixture and concentrate by evaporation. Dissolve the residue in methylene chloride, wash free of acetic acid with water, dry and concentrate to a small volume. Chromatograph over 50 gm. of Florisil and elute with ether. Crystallize the eluate and purify by recrystallization from acetone-hexane.

EXAMPLE 6

*1,4,17(20)-pregnatriene-11β,20-diol-21-al-3-one 20-acetate*

Store at room temperature overnight a solution of 2.0 gm. of 1,4,17(20)-pregnatriene-11β,20-diol-21-al-3-one (the compound of Example 5) in 20.0 ml. of pyridine and 20.0 ml. of acetic anhydride. Add excess water and ice and remove the solvents in an air draft at room temperature. Recrystallize the residue from acetone-hexane.

EXAMPLE 7

Employ the method of any of Examples 1, 3 or 5, to make the following conversions:

4-pregnene-17α,21-diol-3,20-dione to 4,17(20)-pregnadiene-20-ol-21-al-3-one 4-pregnene-17α,21-diol-3,11,20-trione to 4,17(20)-pregnadiene-20-ol-21-al-3,11-dione 1,4-pregnadiene-17α,21-diol-3,11,20-trione to 1,4,17(20)-pregnatriene-20-ol-21-al-3,1-dione 9α-fluoro-4-pregnene-11β,17α,21-triol-3,20-dione to 9α-fluoro-4,17(20)-pregnadiene-11β,20-diol-21-al-3-one 9α-fluoro-1,4-pregnadiene-11β,17α,21-triol-3,20-dione to 9αfluoro-1,4,17(20)-pregnatriene-11β,20-diol-2-al-3-one 9α-chloro-4-pregnene-17α,21-diol-3,11,20-trione to 9α-chloro-4,17(20)-pregnadiene-20-ol-21-al-3,11-dione 9α-chloro-1,4-pregnadiene-17α,21-diol-3,11,20-trione to 9α-chloro-1,4,17(20)-pregnatriene-20-ol-21-al-3,11-dione 9α-fluoro-6α-methyl-4-pregnene-17α,21-diol-3,11,20-trione to 9α-fluoro-6α-methyl-4,17(20)-pregnadiene-20-ol-21-al-3,11-dione 9α-fluoro-6β-methyl-4-pregnene-17α,21-diol-3,11,20-trione to 9α-fluoro-6β-methyl-4,17(20)-pregnadiene-20-ol-21-al-3,11-dione 9α-fluoro-6α-methyl-4-pregnene-11β,17α,21-triol-3,20-dione to 9α-fluoro-6α-methyl-4,17(20)-pregnadiene-11β,20-diol-21-al-3-one 16α-methyl-1,4-pregnadiene-17α,21-diol-3,20-dione to 16α-methyl-1,4,17(20)-pregnatriene-20-ol-21-al-3-one 9α-fluoro-16β-methyl-4-pregnene-17α,21-diol-3,11,20-trione to 9α-fluoro-16β-methyl-4,17(20)-pregnadiene-20-ol-21-al-3,11-dione 9α-fluoro-16α-methyl-4-pregnene-17α,21-diol-3,11,20-trione to 9α-fluoro-16α-methyl-4,17(20)-pregnadiene-20-ol-21-al-3,11-dione 9α-fluoro-16β-methyl-4-pregnene-11β,17α,21-triol-3,20-dione to 9α-fluoro-16β-methyl-4,17(20)-pregnadiene-11β,20-diol-21-al-3-one 9α-fluoro-16α-methyl-4 - pregnene-11β,17α,21 - triol-3,20-dione to 9α-fluoro-16α-methyl-4,17(20) - pregnadiene-11β,20-diol-21-al-3-one 9α-fluoro - 16β-methyl - 1,4-pregnadiene - 17α,21 - diol-3,11,20-trione to 9α-fluoro - 16β-methyl - 1,4,17(20)-pregnatriene-20-ol-21-al-3,11-dione 9α-fluoro - 16α-methyl - 1,4-pregnadiene - 17α,21 - diol-3,11,20-trione to 9α-fluoro - 16α-methyl - 1,4,17(20)-pregnatriene-20-ol-21-al-3,11-dione 9α-fluoro-16β-methyl - 1,4-pregnadiene - 11β,17α,21-triol-3,20-dione to 9α-fluoro-16β-methyl-1,4,17(20) - pregnatriene-11β,20-diol-21-al-3-one 9α-fluoro-16α-methyl-1,4 - pregnadiene-11β,17α,21-triol-3,20-dione to 9α-fluoro - 16α-methyl-1,4,17(20)-pregnatriene-11β-20-diol-21-al-3-one

EXAMPLE 8

Employ the method of any of Examples 2, 4 or 6, to convert any of the enol aldehydes of Example 7 into the coresponding 20-acetates. Where desired, replace the acetic anhydride with any lower alkanoic acid anhydride.

EXAMPLE 9

*Conversion of 1,4,17(20)-pregnatriene-20-ol-21-al-3-one into 1-dehydrodesoxycorticosterone*

To a solution of 0.04 gm. of 1,4,17(20)-pregnatriene 20-ol-21-al-3-one in 10.0 ml. of anhydrous tetrahydro furan at 0° C. add 0.035 gm. of lithium aluminum-tri-t-butoxyhydride. Agitate the mixture for thirty minutes at 0° C. and allow the temperature to rise to room temperature. Add water and extract with methylene chloride. Dry the extracts and concentrate by evaporation. chromatograph over 3.0 gm. of Florisil and elute with 1% methanolmethylene chloride. Crystallize the eluate and purify by recrystallization from acetone-ether.

EXAMPLE 10

*Conversion of 4,17(20)-pregnadiene-11β,20-diol-21-al-3-one into corticosterone*

To a solution of 1.0 gm. of 4,17(20)-pregnadiene-11β,20-diol-21-al-3-one in 25.0 ml. of acetic acid add 25.0 ml. of water and 10.0 gm. of granular zinc. Agitate the mixture at 30–35° C. for four hours. Remove the zinc by filtration and wash with 50% aqueous acetic acid. Combine the filtrates, concentrate in an air draft and add excess water. Extract with methylene chloride. Wash the extract with water, dry and concentrate to a residue. Recrystallize the residue from acetone-hexane.

EXAMPLE 11

*Conversion of 4,17(20)-pregnadiene-11β,20-diol-21-al-3-one 20-acetate into 11-ketoprogesterone*

(A) 4,17(20)-PREGNADIENE-11β,20-DIOL-3-ONE 20-ACETATE

To a solution of 0.325 gm. of 4,17(20)-pregnadiene-11β,20-diol-21-al-3-one 20-acetate in 15.0 ml. of acetic acid add 15.0 ml. of water and 3.0 gm. of zinc granules. Agitate at 30–35° C. for four hours. Remove the zinc by filtration and wash with 50% aqueous acetic acid. Combine the filtrates, concentrate by evaporation and add excess water. Extract with methylene chloride, wash the extract with water, dry and concentrate to a residue. Dissolve the residue in hexane containing a small quantity of methylene chloride and chromatograph over 7 gm. of Florisil. Elute with 50% ether-hexane, crystallize the eluate and purify by recrystallization from acetone-hexane.

(B) 11β-HYDROXYPROGESTERONE

Store at 27° C. for two hours a solution of 0.09 gm. of 4,17(20)-pregnadiene-11β,20-diol-3-one 20-acetate in 5.0 ml. of methanol and 1.0 ml. of 5% methanolic potassium hydroxide. Make the reaction mixture acid and dilute with water. Extract with methylene chloride, wash the extract with water, dry and concentrate to a residue. Recrystallize from acetone-hexane.

(C) 11-KETOPROGESTERONE

To a solution of 0.05 gm. of 11β-hydroxyprogesterone in 2 ml. of acetic acid add 0.011 gm. of chromic acid of 0.5 ml. of water. After three hours storage at room temperature, add excess water and extract with ether. Wash the extract, dry, concentrate and crystallize by the addition of hexane.

I claim:

1. A process for the preparation of steroidal 17-enol-21-aldehydes which comprises refluxing a steroidal substrate of the pregnane series having a molecular structure in which an α-hydroxyl group is attached to the 17-position, a keto group is attached to the 20-position and a hydroxyl is attached to the 21-position with an anhydrous lower fatty acid and isolating the 17(20)-enol-21-aldehyde so produced.

2. The process of claim 1 wherein the anhydrous lower fatty acid has a boiling point below 150° C.

3. The process of claim 1 wherein the anhydrous lower fatty acid is acetic acid.

4. The process of claim 1 wherein the reaction is carried out in the presence of a catalytic quantity of a member of the group consisting of zinc salts of lower fatty acids.

5. The process of claim 4 wherein the zinc salt is zinc acetate dihydrate.

6. Compounds selected from the group consisting of pregnanes having the following structural formulae:

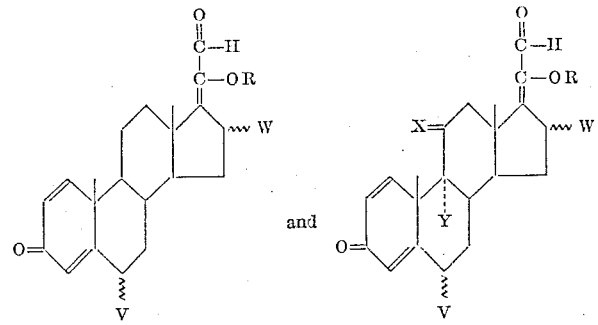

and the 1,2-dihydro analogs thereof wherein V is a member of the group consisting of H and lower alkyl; Y is a member of the group consisting of chlorine and fluorine; W is a member of the group consisting of H and lower alkyl; R is a member of the group consisting of H and lower alkanoyl; and X is a member of the group consisting of O and (H, βOH).

7. 4,17(20)-pregnadiene-20-ol-21-al-3-one.

8. 1,4,17(20)-pregnatriene-20-ol-21-al-3-one.

9. 9α-fluoro-4,17(20)-pregnadiene-11β,20-diol-21-al-3-one.

10. 9α-fluoro-1,4,17(20)-pregnatriene-11β,20-diol-21-al-3-one.

11. 9α-fluoro-16α-methyl-4,17(20)-pregnadiene-20-ol-21-al-3,11-dione.

12. 9α-fluoro-16α-methyl-1,4,17(20)-pregnatriene-20-ol-21-al-3,11-dione.

13. 9α-fluoro-16β-methyl-1,4,17(20)-pregnatriene-20-ol-21-al-3,11-dione.

14. 9α-fluoro-16α-methyl-4,17(20)-pregnadiene-11β,20-diol-21-al-3-one.

15. 9α-fluoro-16β-methyl-4,17(20)-pregnadiene-11β,20-diol-21-al-3-one.

16. 9α-fluoro-16α-methyl-1,4,17(20)-pregnatriene-11β,20-diol-21-al-3-one.

17. 9α-fluoro-16β-methyl-1,4,17(20)-pregnatriene-11β,20-diol-21-al-3-one.

18. 9α-fluoro-16β-methyl-4,17(20)-pregnadiene-20-ol-21-al-3,11-dione.

References Cited by the Examiner

UNITED STATES PATENTS 2,795,594   6/1957   Beyler _____ 260—397.45
2,837,464   6/1958   Nobile _____ 195—51

OTHER REFERENCES

Beyler et al. J.A.C.S., vol. 79, pp. 5297–5300 (1957).
Herzog et al., J.A.C.S., vol. 83, pp. 4073–4076 (Oct. 5, 1961).

LEWIS GOTTS, *Primary Examiner.*

G. F. LANDE, *Assistant Examiner.*